US012057966B2

(12) United States Patent
Jameson et al.

(10) Patent No.: US 12,057,966 B2
(45) Date of Patent: Aug. 6, 2024

(54) PACKET FORWARDING BETWEEN HYBRID TUNNEL ENDPOINTS

(71) Applicant: Arista Networks, Inc., Santa Clara, CA (US)

(72) Inventors: Mitchell Ryan Jameson, Vancouver (CA); Chandrashekhar Appanna, Austin, TX (US); Kaushik Kumar Ram, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 123 days.

(21) Appl. No.: 17/196,488

(22) Filed: Mar. 9, 2021

(65) Prior Publication Data
US 2022/0294665 A1 Sep. 15, 2022

(51) Int. Cl.
H04L 12/46 (2006.01)
H04L 45/74 (2022.01)
(52) U.S. Cl.
CPC ...... *H04L 12/4633* (2013.01); *H04L 12/4641* (2013.01); *H04L 45/74* (2013.01)

(58) Field of Classification Search
CPC ............ H04L 12/4633; H04L 12/4641; H04L 2012/4629; H04L 2101/622; H04L 45/586; H04L 61/103
See application file for complete search history.

(56) References Cited

U.S. PATENT DOCUMENTS

| 10,333,725 | B2* | 6/2019 | He ..................... H04L 12/1886 |
| 2005/0004916 | A1* | 1/2005 | Miller ................ H04L 61/4541 |
| 2016/0330046 | A1* | 11/2016 | Yang ................... H04L 12/4641 |
| 2016/0330125 | A1* | 11/2016 | Mekkattuparamban ..................... H04L 45/32 |
| 2017/0063668 | A1* | 3/2017 | Sivasankar .......... H04L 45/586 |
| 2017/0317919 | A1* | 11/2017 | Fernando ............... H04L 41/40 |
| 2020/0036622 | A1* | 1/2020 | Tamizkar ............... H04L 45/74 |
| 2021/0320818 | A1* | 10/2021 | Sreenivasagaperumal ................... H04L 45/66 |

* cited by examiner

*Primary Examiner* — Mansour Oveissi
(74) *Attorney, Agent, or Firm* — Fountainhead Law Group, PC

(57) ABSTRACT

In a virtual extensible local area network (VxLAN) that includes a deployment of aggregation VxLAN tunnel endpoints (VTEPs) and access point (AP) VTEPs, packet processing by the aggregation VTEPs includes distinguishing between Type 1 VTEPs and Type 2 VTEPs. When the source of an ingress packet and the next hop destination are both Type 1 VTEPs, the ingress packet is dropped.

20 Claims, 12 Drawing Sheets

PACKET FORWARDING BETWEEN HYBRID TUNNEL ENDPOINTS

BACKGROUND

The present disclosure relates to protocol tunneling. With tunneling, data packets are typically encrypted and encapsulated, and the resulting data units are transported over a network. Because the original data packets are encapsulated, the data packets can be viewed as being tunneled through the network in the data units. Tunneling allows private network data to be transported over a public network. Because the units look like public data, the encapsulated private data can be securely transmitted across a public network such as the Internet.

Devices at the endpoints of a tunnel are referred to as tunnel endpoints. A tunnel endpoint is responsible for receiving the original data and encapsulating the data according to a tunneling protocol. The encapsulated data is then sent over the tunnel to the corresponding tunnel endpoint at the other end of the tunnel, where the encapsulated data is decapsulated and forwarded on to the final destination.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1A:
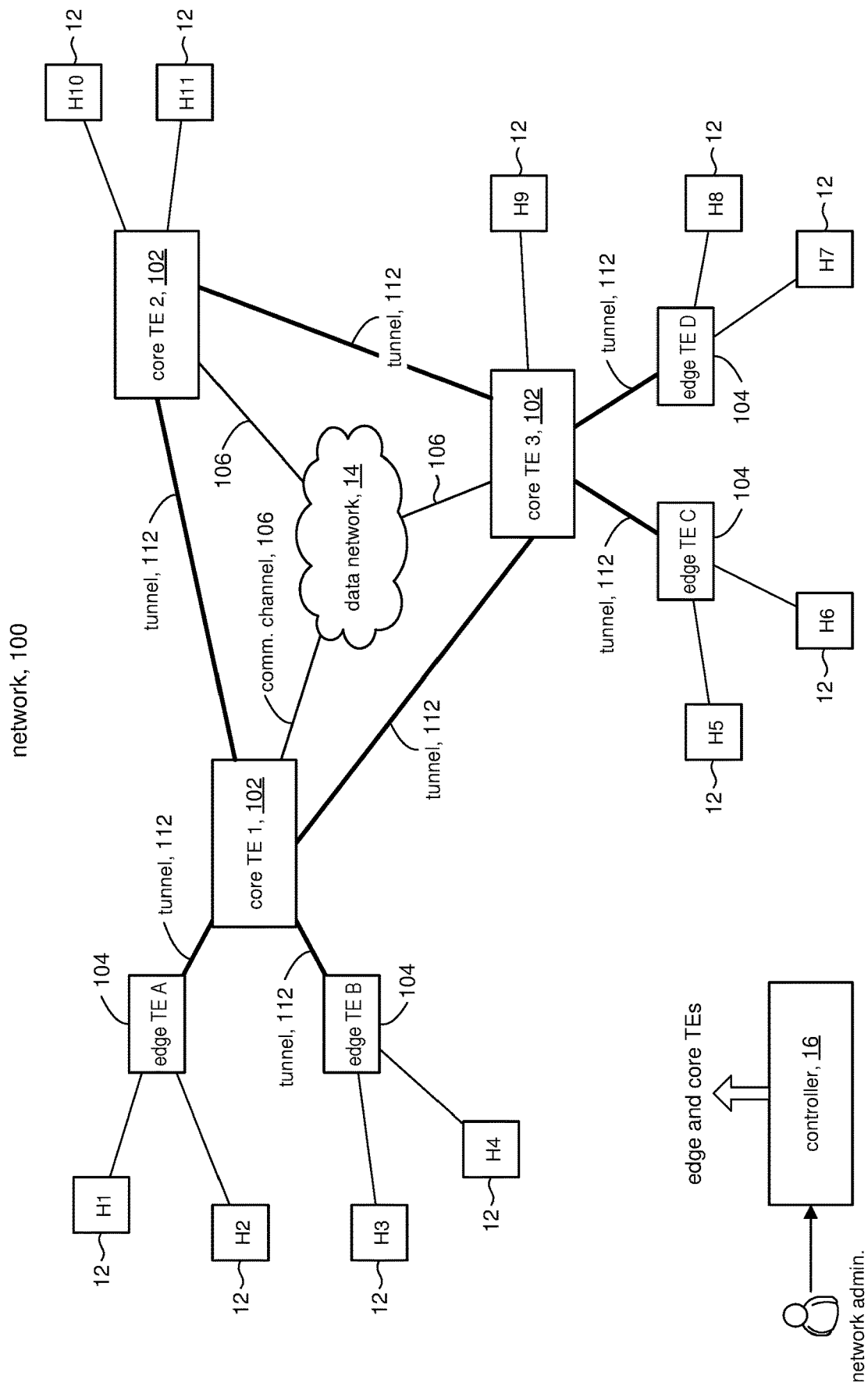
FIG. 1A shows a network deployment in accordance with the present disclosure.

Referring to FIG. 1A, network 100 represents an illustrative example of a network deployment in accordance with some embodiments of the present disclosure. Network 100 provides a communication infrastructure that allows hosts 12 to communicate with each other and with data network 14. Hosts 12 can be server systems (e.g., application servers, file servers, web sites, database systems, etc.) and client devices (e.g., laptop computers, desktop computers, mobile devices, and the like). Data network 14 can include the Internet (e.g., via a public switched telephone network (PSTN)), a local area network (LAN) or wide area network (WAN) in an enterprise or campus, and so on.

Network 100 can comprise network devices 102, 104. In accordance with some embodiments, network devices 102, 104 can be a router, a switch, software running on generic servers, and so on. In accordance with the present disclosure, network 100 can comprise two types of network devices. For reasons that will become clear, network devices 102 will be referred to herein as core tunnel endpoints (core TEs), and network devices 104 will be referred to herein as edge tunnel endpoints (edge TEs). Generally, tunnel endpoints are network devices that are configured to support packet tunneling in accordance with a tunneling protocol. Tunnel endpoints at each end of a tunnel encapsulate packets for transmission over the tunnel and decapsulate packets received from the tunnel. The example in FIG. 1A shows three core TEs and four edge TEs, although it will be appreciated that the configuration shown is merely an illustrative example and that network 100 can be deployed with more or fewer core and edge TEs. Core TEs 102 can be connected to other core TEs and to edge TEs 104 by physical connections (e.g., electrical cables, fiber optic cables, etc.), wireless connections, or a combination of physical and wireless connections. Network 100 can be managed and otherwise maintained by a user (e.g., network administrator), for example, using controller 16.

Core TEs 102 can connect to data network 14 via communication channels 106. In some embodiments, for example, communication channels 106 can be physical connections (e.g., electrical cables, fiber optic cables, etc.), wireless connections, or a combination of physical and wireless connections. In other embodiments, some of the communication channels can be wireless. Edge TEs 104 can access data network 14 via respective core TEs 102 to which the edge TEs are connected.

Hosts 12 can access data network 14 via an edge TE or a core TE. For example, hosts H10 and H11 can be directly connected to core TE 2 to access data network 14. Other hosts on network 100 can access the data network by communicating indirectly with core TEs via an edge TE to access the data network. For example, host H5 can communicate with edge TE C to access the data network via core TE 3.

Core TEs 102 and edge TEs 104 can communicate with each other via virtual tunnels (tunnels) 112. Tunneling is a known and well understood communication technology. Briefly, when a source host wants to transmit an original packet to a destination host that is reachable over a tunnel, the source host can transmit the original packet to an endpoint of the tunnel (tunnel endpoint). The tunnel endpoint encapsulates the original packet in accordance with a tunneling protocol to create a tunneling packet (tunneled packet, encapsulated packet, etc.) that contains the original packet in its payload and designates a remote tunnel endpoint as its destination. The tunneling packet is routed to the remote tunnel endpoint, which then decapsulates the tunneling packet to recover the original packet. The remote tunnel endpoint then forwards the recovered original packet to the next hop on its way to the destination host.

In accordance with some embodiments, traffic between core TEs 102 and edge TEs 104 can be tunneled using any suitable tunneling protocol such as Virtual Extensible Local Area Network (VxLAN), Generic Routing Encapsulation (GRE), Internet Protocol Security (IPSec), and so on. Merely for discussion purposes, however, VxLAN tunneling will be referenced whenever the discussion calls for specific examples of a tunneling protocol.

In accordance with the present disclosure, core TEs 102 can be configured with multiple tunnels. Core TEs 102 can be configured to perform tunnel endpoint bridging so that a given core TE that is configured with several tunnels can reach corresponding tunnel endpoints (core and edge TEs 102, 104) at the other ends of those tunnels. Bridging generally refers to any forwarding at Layer 2 (L2, the data link layer) of the Open Systems Interconnection (OSI) model based on a packet's L2 header. In the context of the present disclosure, tunnel endpoint bridging by a tunnel endpoint involves receiving a tunneled packet on one of the tunnels of the tunnel endpoint, decapsulating the packet, re-encapsulating the packet, and forwarding the packet on another of the tunnels of the tunnel endpoint.

Figure 1B:
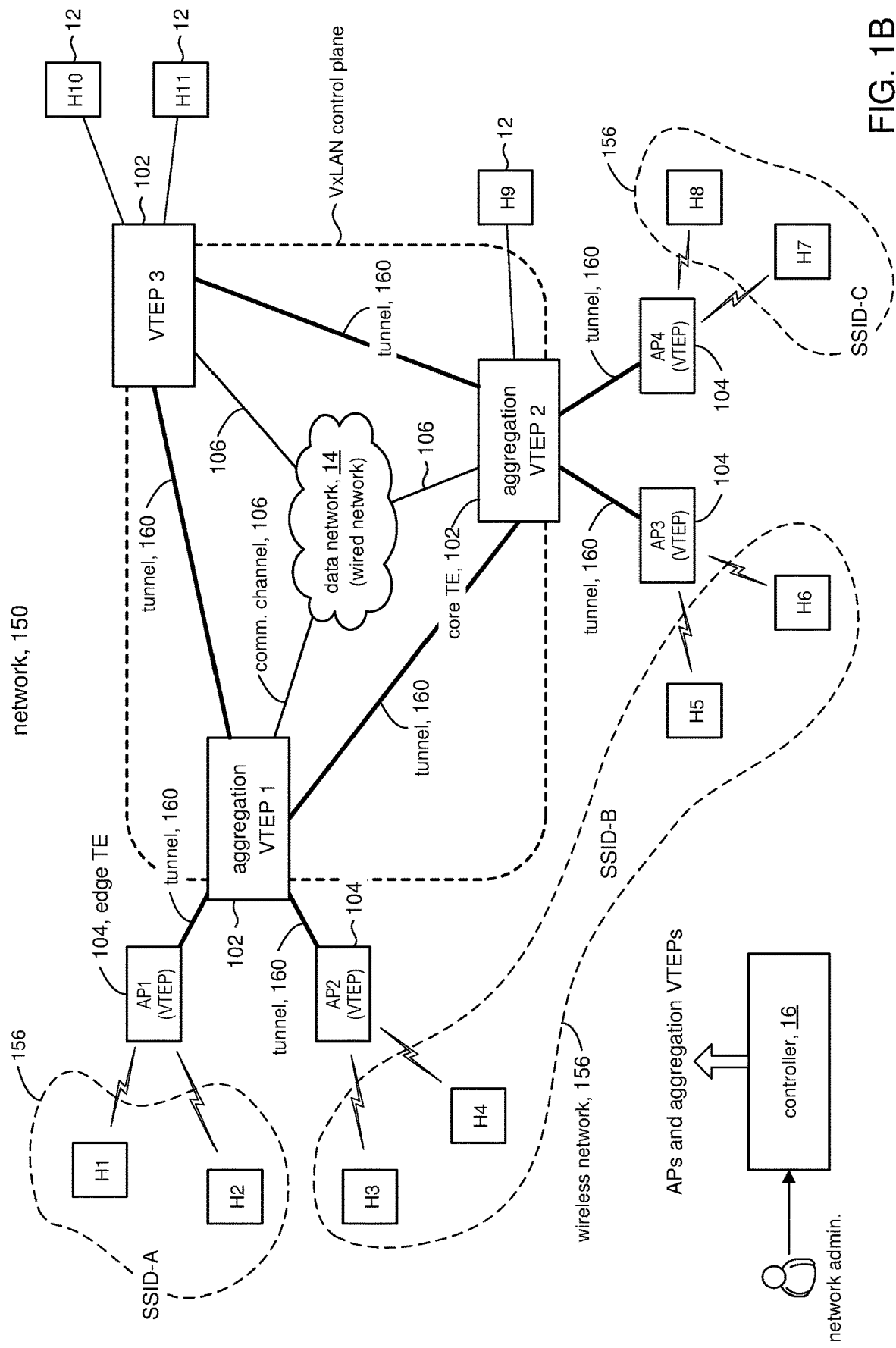
FIG. 1B shows a VxLAN-based network deployment in accordance with the present disclosure.

Referring to FIG. 1B, network 150 is a specific example of a network in accordance with the present disclosure to illustrate aspects of the present disclosure. Network 150 is a VxLAN deployment based on the VxLAN protocol to provide tunneling among its constituent core TEs 102 and edge TEs 104. Devices that are tunnel endpoints of a tunnel in a VxLAN are referred to as VxLAN tunnel endpoints (VTEPs). Core TEs 102 can be configured as VTEPs. Edge TEs 104 can be configured as access points (APs) to wirelessly provide their respective associated hosts H1-H8 with access to data network 14 via the core TEs. The edge TEs are also configured as VTEPs to communicate with their respective core TEs. Edge TEs 104 will be referred to as APs to distinguish from core TEs 102 which will be referred to as VTEPs. APs are connected to their respective VTEPs and communicate over VxLAN tunnels 160. The VTEPs constitute a VxLAN control plane for the purpose of exchanging VxLAN reachability information.

The APs may constitute or otherwise define one or more wireless network segments 156 in network 150. Typically, and as used herein, the term "segment" refers to an L2 segment where devices in the segment communicate at the data link layer by transmitting data in units called frames (e.g., Ethernet frames). For example, AP1 defines a network segment identified by the Service Set Identifier (SSID) SSID-A and AP4 defines another network segment identified as SSID-C. A network segment can span APs that are connected to different VTEPs; AP2 and AP3, for example, define such a network segment identified as SSID-B.

A VTEP that is connected to APs that define an SSID can be referred to as an "aggregation" VTEP. Aggregation VTEPs for a given SSID serve as a distributed gateway for hosts on that SSID. For example, VTEP 1 and VTEP 2 can be referred to as aggregation VTEPs because they support hosts on SSID-B, while VTEP 3 can be referred to as a regular (non-aggregation) VTEP. Aggregation VTEPs in an SSID aggregate and coordinate traffic from hosts in the SSID to provides the hosts with access to data network 14.

Figure 2:
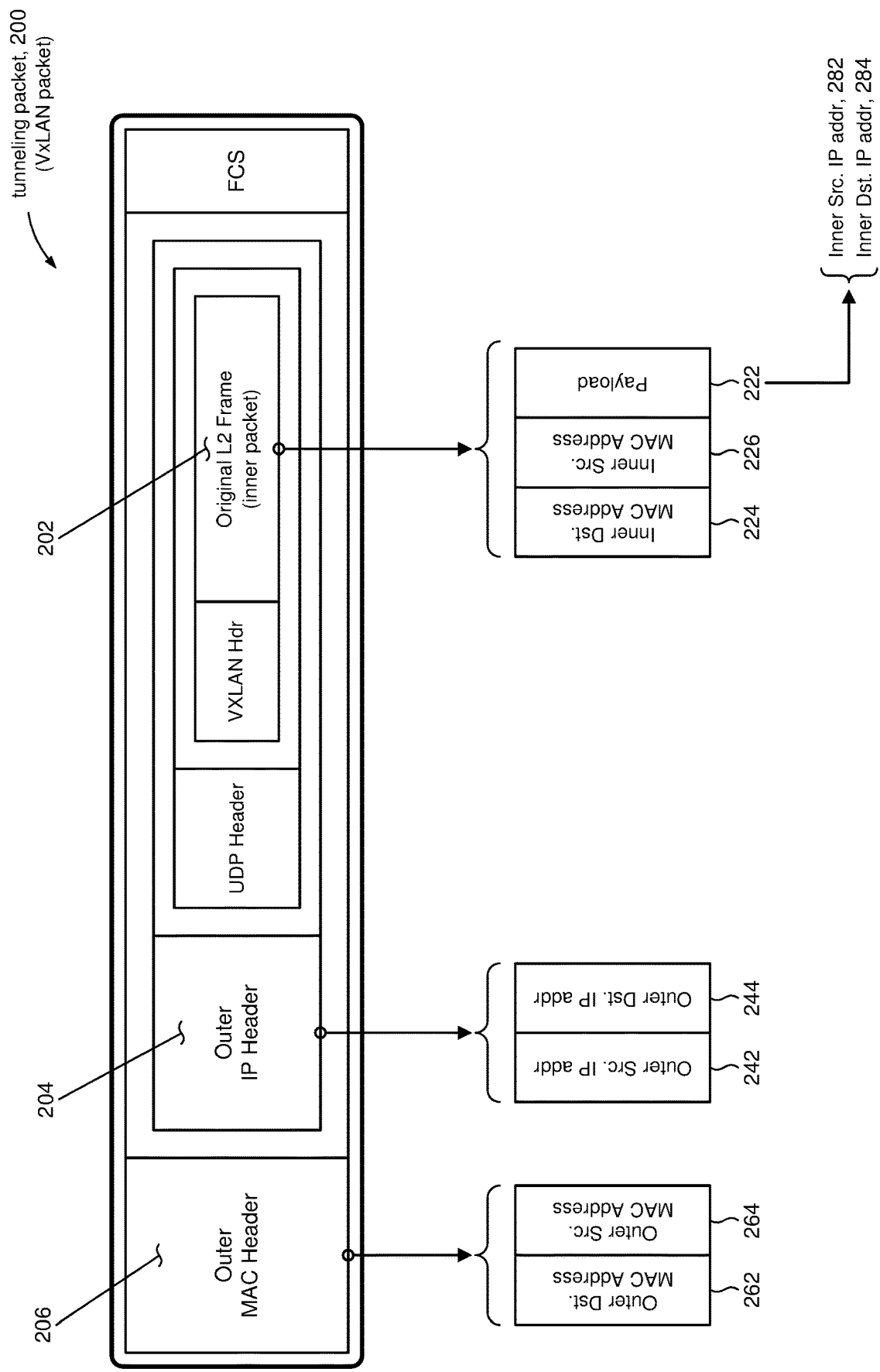
FIG. 2 shows details of a VxLAN packet.

Referring to FIG. 2, an anatomy of VxLAN tunneling packet 200 in accordance with the VxLAN protocol is shown. The VxLAN protocol is a well understood and standardized protocol. For purposes of the present disclosure, only certain fields of VxLAN packet 200 are highlighted. Beginning from the interior of VxLAN packet 200, data field 202 is the payload (inner packet) of the VxLAN packet. Data field 202 is an L2 frame (e.g., an Ethernet frame) that represents the network data from the sending VTEP. Data field 202 contains payload 222, which is the actual data packet of interest (e.g., data from one host to another host). Payload 222 will include Inner Source and Destination Internet protocol (IP) addresses 282, 284, which are the respective IP addresses of the source host and the destination host. Data field 202 also includes Inner Source media access control (MAC) address 224 and Inner Destination MAC address 226. The Inner Source MAC address is the MAC address of the sending host, and the Inner Destination MAC address is the MAC address of the destination host.

Data field 204 is an Outer IP Header of VxLAN packet 200 that includes Outer Source IP address 242, which is the IP address of the source VTEP that sends the tunneled packet, and Outer Destination IP address 244, which is the IP address of the destination VTEP that receives the VxLAN packet.

Data field 206 is an Outer Ethernet Header of the VxLAN packet that includes Outer Source MAC address 262 and Outer Destination MAC address 264. Generally, the Outer Source MAC address and the Outer Destination MAC address can change as the packet is routed from one device (hop) to another in the VxLAN underlay, en route from the source VTEP to the destination VTEP.

To illustrate an example of a VxLAN packet in accordance with the present disclosure, consider host H5 and AP3 in FIG. 1B. Suppose host H5 wants to send a packet (original packet) to another host (e.g., host H1) on the network. The process begins with Host H5 transmitting the original packet to AP3. AP3 will transmit a VxLAN packet that encapsulates the original packet to aggregation VTEP 2. The VxLAN packet from AP3 to VTEP 2 will include the following information:

Outer Source MAC address, 264—MAC address of AP3 (source of the VxLAN packet)
Outer Destination MAC address, 262—MAC address of aggregation VTEP 2 (next hop in the underlay, and in this case a tunnel endpoint of the VxLAN packet)
Outer Source IP address, 242—IP address of AP3
Outer Destination IP address, 244—IP address of aggregation VTEP 2
Inner Source MAC address, 226—MAC address of host H5 (source of the original packet)
Inner Destination MAC address, 224—MAC address of host H1 (destination of the original packet)
payload, 222—contains the original packet, which includes:
    Inner Source IP address, 282—IP address of host H5 (source of the original packet)
    Inner Destination IP address, 284—IP address of host H1 (destination of the original packet)

To illustrate a VTEP to VTEP bridging example, we will continue the above example with a description of how VTEP 2 processes the VxLAN packet from AP3. The process begins with VTEP 2 receiving the above-described VxLAN packet from AP3 over one tunnel. VTEP 2 performs the bridging operation by decapsulating the received VxLAN packet to recover the original packet and re-encapsulating the recovered original packet in a subsequent VxLAN packet that is then sent to VTEP 1 over another tunnel. The VxLAN packet from VTEP 2 to VTEP 1 will include the following information:

Outer Source MAC address, 264—MAC address of VTEP 2 (source of the VxLAN packet)
Outer Destination MAC address, 262—MAC address of VTEP 1 (next hop in the underlay, and in this case a tunnel endpoint of the VxLAN packet)
Outer Source IP address, 242—IP address of VTEP 2
Outer Destination IP address, 244—IP address of VTEP 1
Inner Source MAC address, 226—MAC address of host H5 (source of the original packet).
Inner Destination MAC address, 224—MAC address of host H1 (destination of the original packet)
payload, 222—contains the original packet, which includes:
Inner Source IP address, 282—IP address of host H5 (source of the original packet)
Inner Destination IP address, 284—IP address of host H1 (destination of the original packet)

For the remaining discussion, and without loss of generality, reference will be made to the configuration shown in FIG. 1B in order to provide a specific example of core TEs 102 and edge TEs 104, namely aggregation VTEPs and AP VTEPs respectively. It will be appreciated that the following description, although made in the context of VxLAN and VTEP technology may be adaptable to other tunneling protocols and tunnel endpoints.

In accordance with the present disclosure, aggregation VTEPs are distinguished over AP VTEPs. Aggregation VTEPs, and more generally core TEs, can be designated as Type 1. AP VTEPs, and more generally edge TEs, can be designated as Type 2. A Type 1 VTEP can be characterized as being a tunnel endpoint for several tunnels. Stated another way, a Type 1 VTEP can perform bridging between several tunnels that terminate at that VTEP. A Type 1 VTEP can reach multiple other VTEPs whether those other VTEPs are Type 1 or not. A Type 2 VTEP can be characterized as being a tunnel endpoint for a single tunnel. Aggregation VTEP 1 in FIG. 1B, for example, is a tunnel endpoint for four tunnels, respectively, between AP1, AP2, VTEP 2, and VTEP 3, and so can be designated Type 1. By comparison, AP4 is an endpoint for a single tunnel, namely the tunnel to VTEP 2, and so can be designated Type 2. It is noted that the Type 1 and Type 2 designations are merely a matter of nomenclature and other designations can be used.

Figure 3:
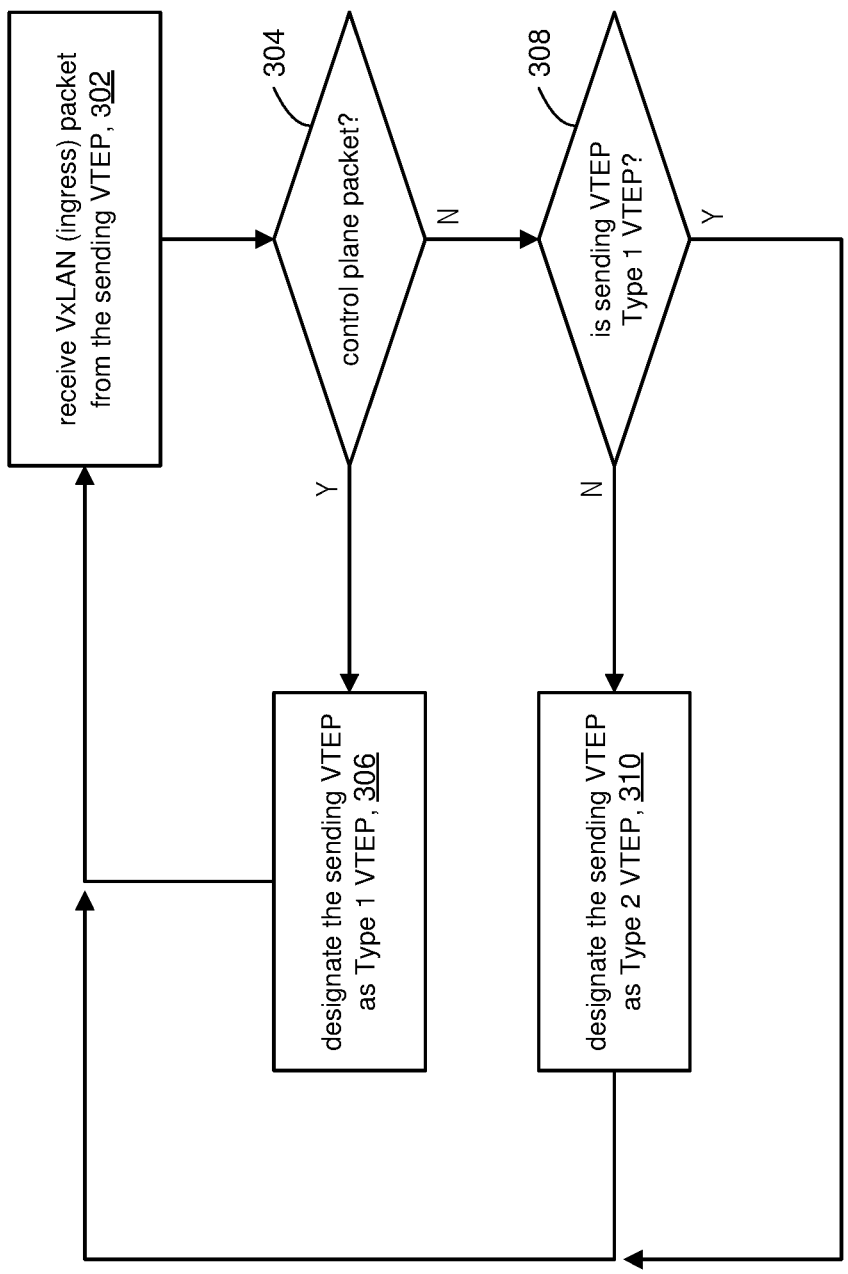
FIG. 3 describes Type 1, Type 2 designation in accordance with some embodiments of the present disclosure.

Referring to FIG. 3, the discussion will now turn to a high level description of processing in an aggregation VTEP to automatically designate or otherwise classify VTEPs as being Type 1 or Type 2 in accordance with some embodiments of the present disclosure. In some embodiments, for example, the aggregation VTEP can include computer executable program code, which when executed by a processor (e.g., 1008, FIG. 10), can cause the processor to perform operations in accordance with FIG. 3.

Each aggregation VTEP learns about the VTEPs at the other ends of the tunnels for which the aggregation VTEP is an endpoint. For example, aggregation VTEP 1 learns about AP1, AP2, VTEP 2, and VTEP 3 and stores these VTEPs in its forwarding database (FDB). FDBs are known data structures. As the name suggests, a FDB includes forwarding information for VTEPs learned by the aggregation VTEP such as IP address, MAC address, and so on. Aggregation VTEP 2, likewise, learns about AP3, AP4, VTEP 1, and VTEP 3 and stores the learned information in its FDB; and so on with other aggregation VTEPs in the network. VTEPs can be learned through a variety of known learning mechanisms, for example, Ethernet Virtual Private Network (EVPN) to learn about aggregation VTEPs and data path learning to learn MAC addresses behind AP VTEPs.

At operation 302, the aggregation VTEP can receive a tunneled (ingress) packet on one of its ports (ingress port). In accordance with the present disclosure, for example, the received ingress packet can be a VxLAN packet (FIG. 2). The sending VTEP can be an AP or an aggregation VTEP.

At decision point 304, if the received packet contains a control plane packet, then processing can proceed to operation 306. If the received packet contains a data plane packet, then processing can proceed to decision point 308. In some embodiments, for example, the aggregation VTEP can decapsulate the received ingress packet to recover the payload (e.g., 222, FIG. 2) contained in the ingress packet, and then extract the inner packet contained in the recovered payload. Information contained in the inner packet can be used to determine if it is a control plane packet or a data plane packet.

Data plane and control plane concepts are known. Briefly, the control plane in a switching device controls how data packets are forwarded from one device to another. The process of creating a routing table, for example, is an example of a control plane function, and uses protocols such as Border Gateway Protocol (BGP), Open Shortest Path First (OSPF), and the like. Traffic arising from such protocols are an example of control plane traffic. The data plane in a switching device performs forwarding of host-originated traffic, receiving data packets from one host to be delivered to another host. The data plane is sometimes referred to as the forwarding plane.

Merely for illustrative purposes, consider the BGP EVPN protocol, for instance. Suppose the received packet is destined for the aggregation VTEP and specifies either a BGP EVPN MAC-IP route (also referred to as an EVPN Type 2 route) or a BGP EVPN Inclusive Multicast Ethernet Tag route (IMET) route (also referred to as an EVPN Type 3 route). After the VTEP decapsulates the received packet, and because the inner packet is destined for this VTEP, the packet will be trapped to the VTEP's CPU. At that point software executing on the CPU will classify the packet as a BGP packet, then as an EVPN packet, and then finally classifies it based on EVPN route type. Any packet that does not get classified as a BGP EVPN MAC-IP or IMET route can functionally be considered a data plane packet. It will be appreciated that the control plane/data plane distinction can likewise be made when other protocols are involved.

At operation 306, the aggregation VTEP can designate the sending VTEP as a Type 1 VTEP in response to detecting that the aggregation VTEP has received a control plane packet from the sending VTEP. In some embodiments, for example, the FDB in the aggregation VTEP can include a data field to store device type information. Accordingly, the entry in the FDB corresponding to the sending VTEP can be updated to indicate a device type of TYPE 1. In some embodiments, if the device type of the sending VTEP is currently designated Type 2, then the aggregation VTEP can re-designate the sending VTEP as Type 1. Processing of the received packet can be deemed complete and processing can return to operation 302 to receive and process the next packet.

At decision point 308, the received packet can be deemed to be a data plane packet if it is not a control plane packet.

If the sending VTEP is not designated as Type 1 in the aggregation VTEP's FDB, then processing can proceed to operation 310. For instance, the entry for the sending VTEP in the aggregation VTEP's FDB may not have a Type 1 or Type 2 designation. For example, if the sending VTEP is newly installed in the network it may not have a designation.

If the sending VTEP has been previously designated as Type 2, then processing can proceed to operation 310.

If the sending VTEP is designated as being Type 1 in the aggregation VTEP's FDB, then processing of the received packet can be deemed complete, and processing can return to operation 302 to process the next received packet. In accordance with some embodiments, when a VTEP is designated as Type 1, then that VTEP remains Type 1 even if it subsequently receives data plane traffic.

In other embodiments, a Type 1 VTEP can lose its designation as "Type 1". For example, the entry for the Type 1 VTEP may age out in the FDB. If the VTEP is relearned, it can be designated as a Type 2 VTEP in response to receiving a data plane packet.

At operation 310, the aggregation VTEP can designate the sending VTEP, in its FDB, as a Type 2 VTEP in response to detecting that it has received a data plane packet from the sending VTEP. Processing of the received packet can be deemed complete and processing can return to operation 302 to receive and process the next packet.

In some embodiments, the designation of VTEPs as Type 1 or Type 2 can be manual. For example, the aggregation VTEP itself can include a suitable command line interface that allows a user (e.g., network administrator) to manually program VTEPs in the FDB of the aggregation VTEP as being Type 1 or Type 2. In some embodiments, manual programming can be achieved via a suitable interface on controller 16 (FIG. 1B). In some embodiments, an out of band communication channel (not shown) can be provided to allow the VTEPs to communicate directly with each other to exchange information indicating whether they are designated as Type 1 or Type 2. In some embodiments, Type 1 and Type 2 designations can be achieved using a suitable in-band protocol that is exchanged between the VTEPs.

Figure 4:
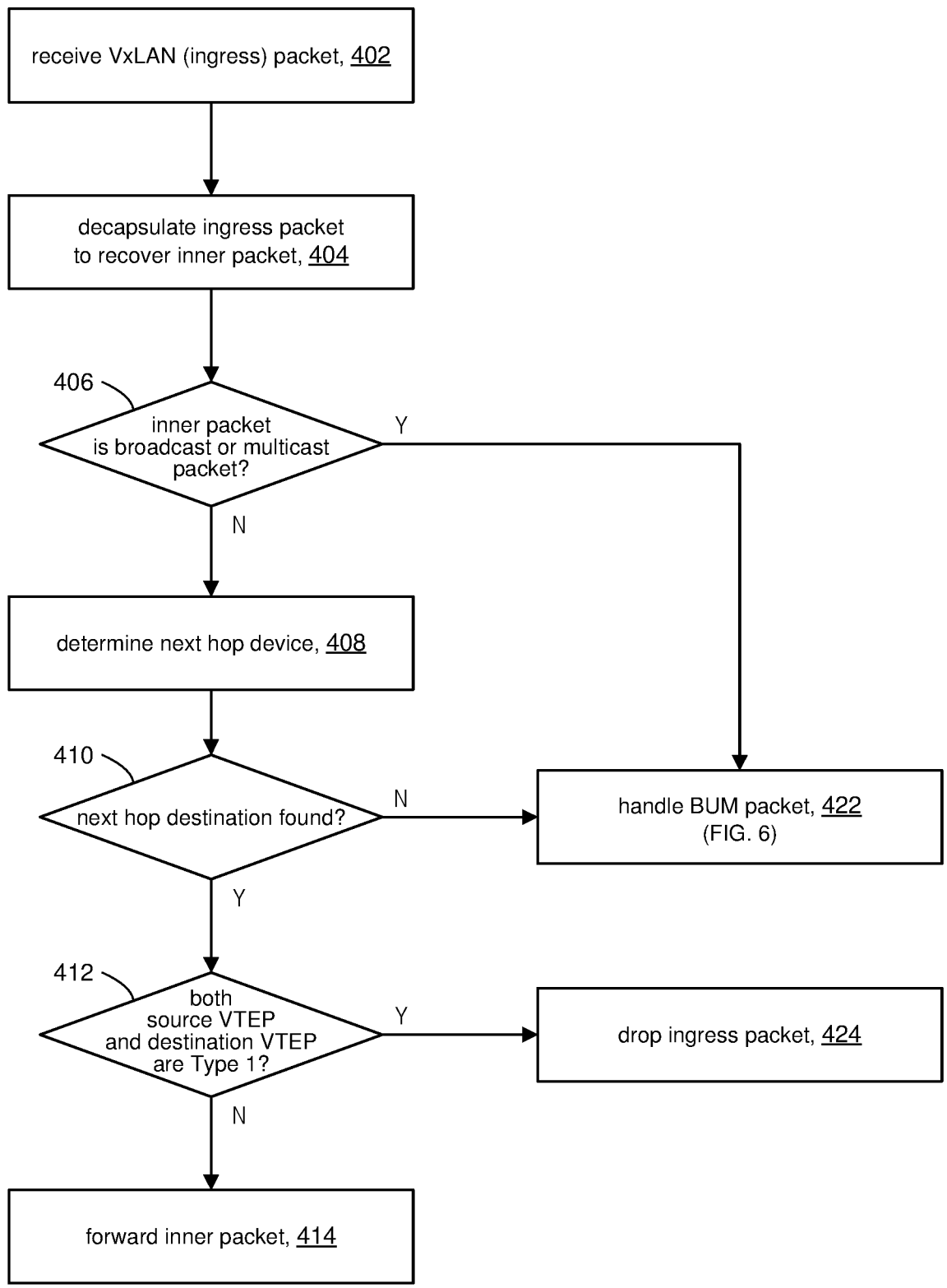
FIG. 4 describes tunnel bridging in accordance with some embodiments of the present disclosure.
Figure 5:
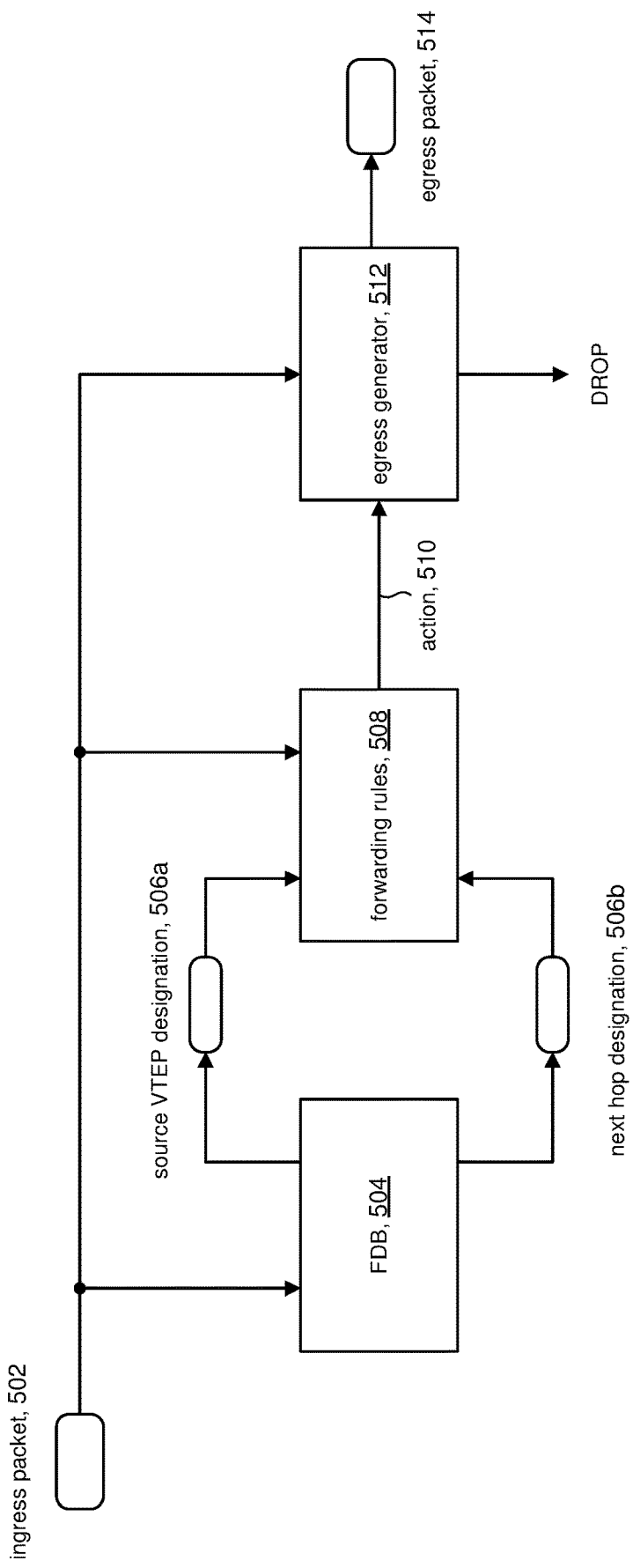
FIG. 5 is a high-level schematic illustration of processing a packet through a forwarding database and a rules table.

Referring to FIGS. 4 and 5 and other figures, the discussion will now turn to a high level description of processing in a core TE to provide bridging between tunnels and forward packets in accordance with the present disclosure. The description will refer to an aggregation VTEP as a specific example. In some embodiments, for instance, the aggregation VTEP can include computer executable program code, which when executed by a processor (e.g., 1008, FIG. 10), can cause the processor to perform operations in accordance with FIG. 4. It will be appreciated that the operations below can be adapted to other tunneling protocols.

At operation 402, the aggregation VTEP can receive a tunneled (ingress) packet on one of its ports (ingress port). In accordance with the present disclosure, for example, the received ingress packet can be a VxLAN packet (FIG. 2). The sender (source VTEP) of the received ingress packet can be an AP or an aggregation VTEP.

At operation 404, the aggregation VTEP can decapsulate the received ingress packet to recover the payload (e.g., 222, FIG. 2) contained in the ingress packet, and then extract the inner packet contained in the recovered payload. For example, if the received ingress packet is from an AP (e.g., AP1, FIG. 1B), then the recovered inner packet can be an original packet sent from an associated host (e.g., H1) and encapsulated by the AP. If the ingress packet is from an aggregation VTEP (e.g., VTEP 2), then the recovered inner packet can come from a packet sent to the aggregation VTEP and encapsulated by the aggregation VTEP.

At decision point 406, if the recovered inner packet is a broadcast packet or a multicast packet, then processing in the aggregation VTEP can proceed to operation 422 to handle broadcast and multicast packets in accordance with the present disclosure. If the recovered inner packet is neither a broadcast packet nor a multicast packet, then processing in the aggregation VTEP can proceed to operation 408.

Broadcast Packet—In some embodiments, the aggregation VTEP can determine that the recovered inner packet is a broadcast packet based on its destination MAC address. Referring to the VxLAN packet shown in FIG. 2, for example, a broadcast packet can be detected based on the inner destination MAC address (224) contained in the inner packet. A broadcast packet is intended to target all nodes on the network, and can be identified by a destination MAC address that contains all 1's, namely:

FF:FF:FF:FF:FF:FF.

Multicast Packet—Similarly, in some embodiments, the aggregation VTEP can determine that the recovered inner packet is a multicast packet based on its inner destination MAC address (224). A multicast packet can be identified when the least significant bit in the first octet of the MAC address is set to '1'.

At operation 408 the aggregation VTEP can determine a next hop destination to which the recovered inner packet can be forwarded. In some embodiments, for example, the aggregation VTEP can include a forwarding database (FDB) comprising one or more lookup tables to determine the next hop destination based on the destination MAC address contained in the inner packet. The next hop destination can be an AP, another aggregation VTEP, a non-aggregation VTEP, etc. For example, and with reference to FIG. 1B, consider aggregation VTEP 1 and host H4. If host H4 sends a packet to host H1, the destination MAC (DMAC) would be the MAC address of H1 and the next hop destination from the FDB aggregation VTEP 1 would be AP1. If host H4 sends a packet to host H6, then the DMAC would be for H6 and the next hop destination identified by aggregation VTEP 1 would be aggregation VTEP 2. If host H4 sends a packet to host H10, then DMAC would be for H10 and the next hop destination would be VTEP 3.

At decision point 410, if the aggregation VTEP's FDB does not map the destination MAC address of the received inner packet to a next hop destination, the inner packet can be deemed to be an unknown "unicast" packet and processing in the aggregation VTEP can proceed to operation 422 to process an unknown unicast packet in accordance with the present disclosure. If the FDB maps the destination MAC to a next hop destination, then processing in the aggregation VTEP can proceed to decision point 412.

At decision point 412, if the source of the received ingress packet and the next hop destination are both designated as Type 1 devices, this indicates there may be an inconsistency in the control plane. For example, either the source VTEP and/or the aggregation VTEP currently processing the packet may have an incorrect or out of date next hop information in their respective FDBs for the inner destination MAC address. The aggregation VTEP can drop the ingress packet (operation 424) in accordance with the present disclosure and processing of the ingress packet can be deemed complete. If either the source of the received ingress packet or the next hop destination is not a Type 1 device, then processing of the ingress packet continues and the aggregation VTEP can proceed to operation 414.

In some embodiments, the aggregation VTEP can include a table of forwarding rules to determine that both devices are Type 1 devices. Forwarding rules are known and can be stored in a suitable data store such as a ternary content-addressable memory (TCAM). Generally, forwarding rules can include one or more match criteria and one or more action codes. Information generated while processing an ingress packet can be used to find a matching rule, and the action(s) in the matched rule can be applied. In accordance with the present disclosure, the forwarding rules can include a rule with the following match criteria and action code:

match criteria:
    1) SOURCE DEVICE: <IP ADDRESS> && DEVICE TYPE=="TYPE 1" AND
    2) NEXT HOP DESTINATION: DEVICE TYPE=="TYPE 1"
action code: DROP where the default action (no match) is to FORWARD the packet. The first match criterion matches on an ingress packet sent (sourced) from a device having the specified IP address and is designated a Type 1 device. In some embodiments, the IP address can be omitted from the match criteria. The second match criterion matches on a next hop destination device that is designated a Type 1 device. If the forwarding rule matches on both criteria, the aggregation VTEP will DROP the ingress packet. If the forwarding rule does not match on both criteria, the aggregation VTEP can FORWARD the ingress packet, subject to other rules that may be matched. This flow can be schematically represented as shown in FIG. 5. Information on ingress packet 502 (e.g., source IP address) can be provided to FDB 504. The FDB can provide information 506a, 506b that indicates the device designations (Type 1, Type 2), respectively, of the sender (source VTEP) and the next hop device. If the above rule from forwarding rules 508 is matched, then action 510 can indicate to egress generator 512 to drop ingress packet 502; otherwise, egress generator 512 can generate egress packet 514.

In some embodiments, the match can be based on matching for Type 2 devices instead of matching for Type 1 devices. In some embodiments, for example, the forwarding rules can include the following rules with the following match criteria and action codes:

Rule 1 match criterion:
    SOURCE DEVICE: <IP ADDRESS> && DEVICE TYPE=="TYPE 2"
action code: FORWARD
Rule 2 match criterion:
    NEXT HOP DESTINATION: DEVICE TYPE=="TYPE 2"
action code: FORWARD where the default action (no match) is to DROP the packet. Rule 1 matches on an ingress packet sent (sourced) from a device having the specified IP address and is designated a Type 2 device. In some embodiments, the IP address can be omitted from the match criteria in Rule 1. Rule 2 matches on a next hop destination device that is designated a Type 2 device. If either forwarding rule matches, the aggregation VTEP will FORWARD the ingress packet. If neither forwarding rule matches, the aggregation VTEP can DROP the ingress packet, subject to other rules that may be matched.

Continuing with FIG. 4, at operation 414, the aggregation VTEP can forward the recovered inner packet to the next hop destination, subject to processing in accordance with any additional forwarding rules that may be matched. For example, a forwarding rule may be defined to make a log entry in a system log, redirect the received ingress packet to a firewall server, drop the packet anyway, and so on. For discussion purposes, we will assume the recovered inner packet is allowed to be forwarded. Accordingly, if the next hop destination is a VTEP, then the aggregation VTEP can encapsulate the inner packet to produce an egress VxLAN packet that can then be forwarded on the tunnel associated with the destination VTEP. This represents the bridging action where the ingress packet is received at operation 402 on one tunnel and forwarded on another tunnel. Processing of the received ingress packet by the aggregation VTEP can be deemed complete.

Figure 6:
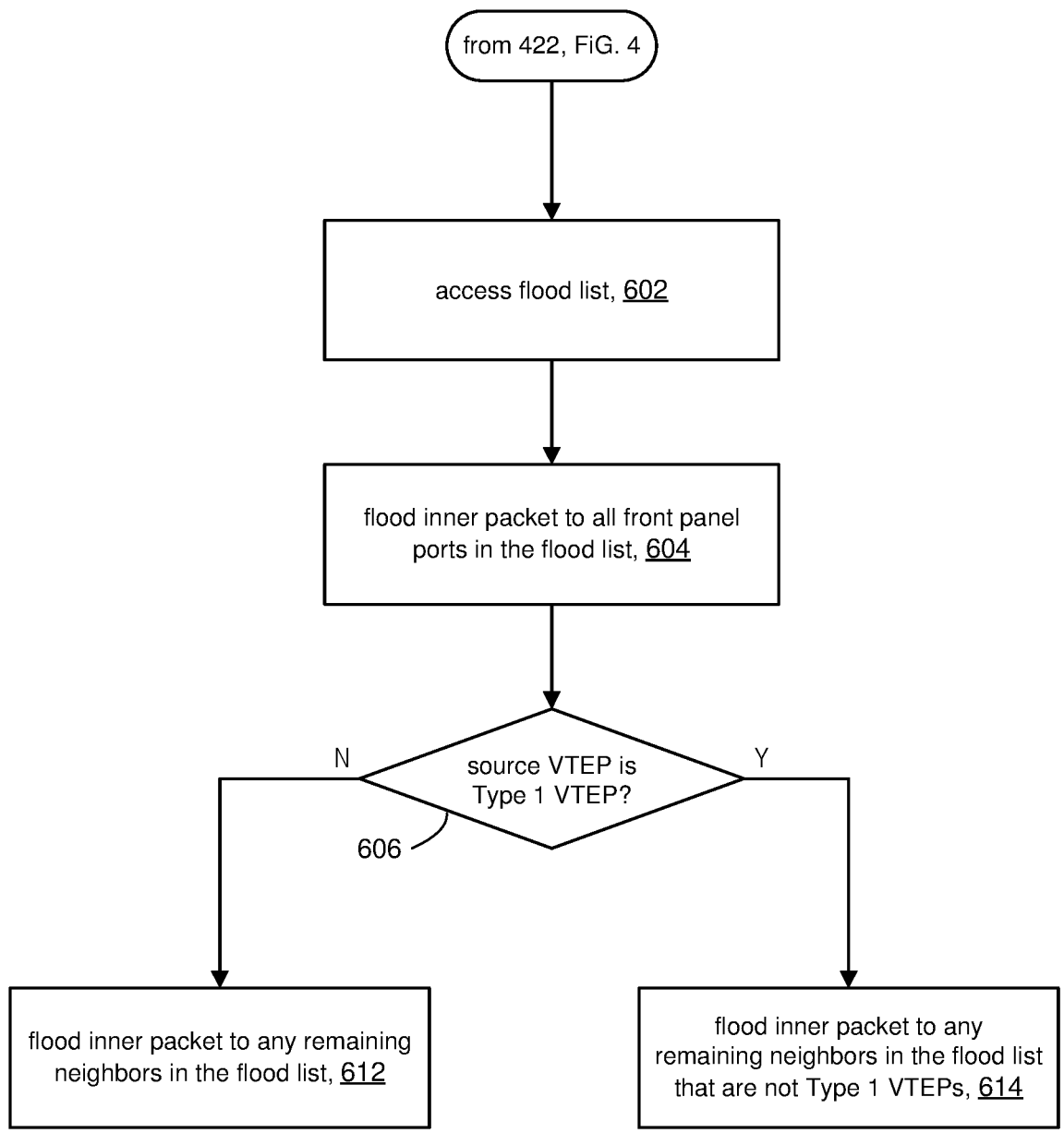
FIG. 6 describes Broadcast, Unknown Unicast, and Multicast (BUM) processing in accordance with some embodiments of the present disclosure.

Referring to FIG. 6, the discussion will now turn to a high level description of processing in a core TE to handle Broadcast, Unknown Unicast, and Multicast (BUM) traffic in accordance with the present disclosure. The description will refer to an aggregation VTEP as a specific example. In some embodiments, for instance, the aggregation VTEP can include computer executable program code, which when executed by a processor (e.g., 1008, FIG. 10), can cause the processor to perform operations in accordance with FIG. 6. The operations described below pick up from operation 422 in FIG. 4, when a determination had been made that the received ingress packet is a broadcast or multicast packet, or that the destination MAC address in the recovered inner packet is unknown.

At operation 602, the aggregation VTEP can access a flood list to identify neighbors of the aggregation VTEP. Neighbors in the flood list can include front panel ports of the aggregation VTEP and other VTEPs in network 150, such as APs and aggregation VTEPs. The flood list can be built up dynamically through known mechanisms. For example, in some embodiments, EVPN type 3 Inclusive Multicast Ethernet Tag (IMET) routes can be used to add Type 1 VTEPs to the flood list. Datapath learning can be used to add APs (Type 2 VTEPs) to the flood list. Other mechanisms can include direct configuration of the aggregation VTEP by a network administrator using a suitable interface (e.g., a command line interface on the VTEP), or via controller 16.

At operation 604, the aggregation VTEP can forward one copy of the recovered inner packet to any front panel ports of the aggregation VTEP specified in the flood list, without encapsulating the inner packet in a VxLAN packet. Processing can proceed in accordance with the present disclosure as follows for the remaining neighbors in the flood list.

At decision point 606, if the source VTEP is not a Type 1 VTEP, then processing in the aggregation VTEP can proceed to operation 612. If the source VTEP is a Type 1 VTEP, then processing in the aggregation VTEP can proceed to operation 614.

At operation 612, the aggregation VTEP can forward one copy of the recovered inner packet to each remaining neighbor in the flood list, irrespective of whether the neighbor device is a Type 1 VTEP or not, subject to any matched forwarding rules (e.g., a matched forwarding rule may require the inner packet to be dropped for a given neighbor). If the neighbor is a VTEP, then the inner packet can be VxLAN encapsulated and tunneled to that neighbor. If the neighbor is not a VTEP, then the aggregation VTEP can transmit the inner packet to the non-VTEP neighbor. In some embodiments, the aggregation VTEP can apply source pruning on the flood list whereby the packet is not flooded to any neighbor in the flood list that refers to the source VTEP. Processing of the received ingress packet by the aggregation VTEP can be deemed complete.

At operation 614, the aggregation VTEP can forward one copy of the recovered inner packet to each remaining neighbor in the flood list that is not a Type 1 device, subject to any matched forwarding rules (e.g., a matched forwarding rule may require the inner packet to be dropped for a given neighbor). As explained above, in some embodiments, the aggregation VTEP can apply source pruning on the flood list in which the aggregation VTEP will not flood to any neighbor in the flood list that references the source VTEP. Also as explained above, the inner packet can be encapsulated or not depending on whether the neighbor is a VTEP or not. Processing of the received ingress packet by the aggregation VTEP can be deemed complete.

The discussion will now turn to traffic flow examples to provide context for the operations of FIGS. 4 and 6. The examples will be illustrated using a VxLAN configured network.

Figure 7:
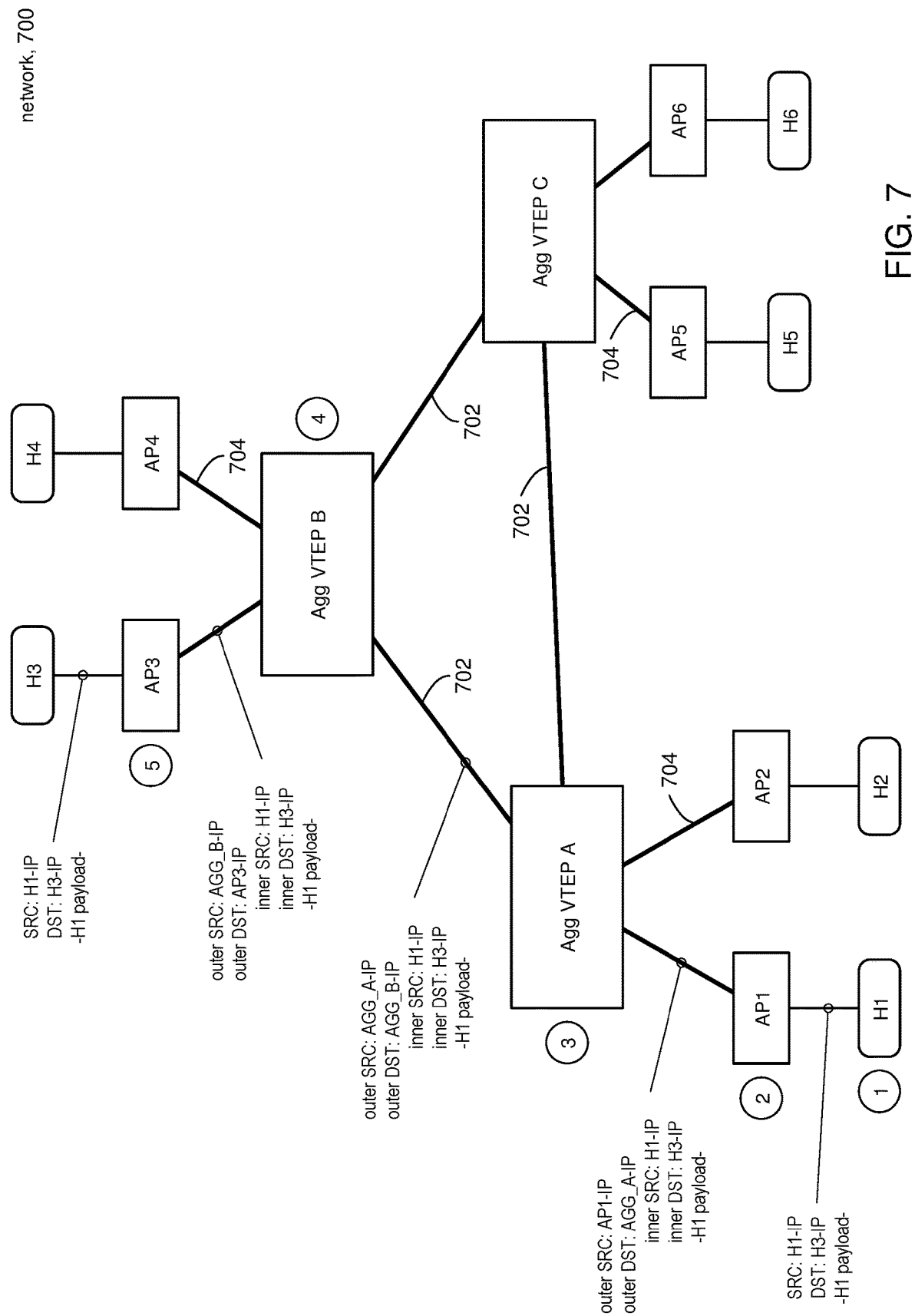
FIGS. 7, 8A, 8B illustrate traffic examples in accordance with the present disclosure.

Referring to FIG. 7, bridging in network 700 is described for unicast traffic. Network 700 comprises aggregation VTEPs A, B, and C, and access point VTEPs AP1 to AP6 connected to their respective aggregation VTEPs. Aggregation VTEPs A, B, and C can communicate with each other over VxLAN tunnels 702. Similarly, AP1 to AP6 communicate with their respective aggregation VTEPs over respective VxLAN tunnels 704. The APs provide wireless access for their respective associated hosts H1 to H6.

FIG. 7 shows the traffic flow for a packet sent from host H1 to host H3. The traffic flow is described in terms of a series of actions identified by time indices that are represented in the figure as circled numerals. The time indices do not impose or imply any specific timing, coordination, or sequencing of actions, but rather serve only to provide a general idea of the timing and sequencing of actions. It is understood that the actual order in which the actions are performed will depend on particular embodiments of the present disclosure. References to operations in FIG. 4 are made when appropriate. References to aggregation VTEPs A, B, and C will be shortened to VTEPs A, B, and C.

At time index 1, host H1 transmits a (original) packet to AP1 with the following IP address information:
SRC: H1-IP
DST: H3-IP
—H1 PAYLOAD—

At time index 2, AP1 encapsulates the original packet in a VxLAN packet and forwards the VxLAN packet to VTEP A with the following IP address information:
OUTER SRC: AP1-IP
OUTER DST: AGG_A-IP
INNER SRC: H1-IP
INNER DST: H3-IP
—H1 PAYLOAD—

At time index 3, aggregation VTEP A receives the VxLAN packet from AP1 (operation 402). VTEP A performs VTEP to VTEP bridging between tunnel 704 and tunnel 702. VTEP A decapsulates the received VxLAN packet to recover the inner original packet (operation 404). The next hop destination can be determined from the inner destination MAC address in the original packet, which in this example is VTEP B (operation 408). Because the source VTEP, namely AP1, is a Type 2 VTEP and the next hop destination, namely VTEP B, is a Type 1 VTEP, the original packet is allowed to proceed (decision point 412). Accordingly, the original packet is encapsulated and forwarded in a VxLAN packet to VTEP B (this is the bridging operation) with the following IP address information (operation 414):
OUTER SRC: AGG_A-IP
OUTER DST: AGG_B-IP
INNER SRC: H1-IP
INNER DST: H3-IP
—H1 PAYLOAD—

At time index 4, VTEP B receives the VxLAN packet from VTEP A (operation 402). VTEP B decapsulates the received VxLAN packet to recover the inner original packet (operation 404). The next hop destination can be determined from the inner destination MAC address in the original packet, which in this example is AP3 (operation 408). Because the source VTEP, namely VTEP A, is a Type 1 VTEP and the next hop destination, namely AP3, is a Type 2 VTEP, the original packet is allowed to proceed (decision point 412). Accordingly, the original packet is encapsulated and forwarded in a VxLAN packet to AP3 (this is a bridging action) with the following IP address information (operation 414):
OUTER SRC: AGG_B-IP
OUTER DST: AP3-IP
INNER SRC: H1-IP
INNER DST: H3-IP
—H1 PAYLOAD—

At time index 5, AP3 receives the VxLAN packet from VTEP B, and decapsulates the received VxLAN packet to recover the original packet. The next hop destination can be determined from the destination MAC address in the original packet using a FDB in AP3, which in this example is H3. The original packet is forwarded to H3.

Figure 8A:
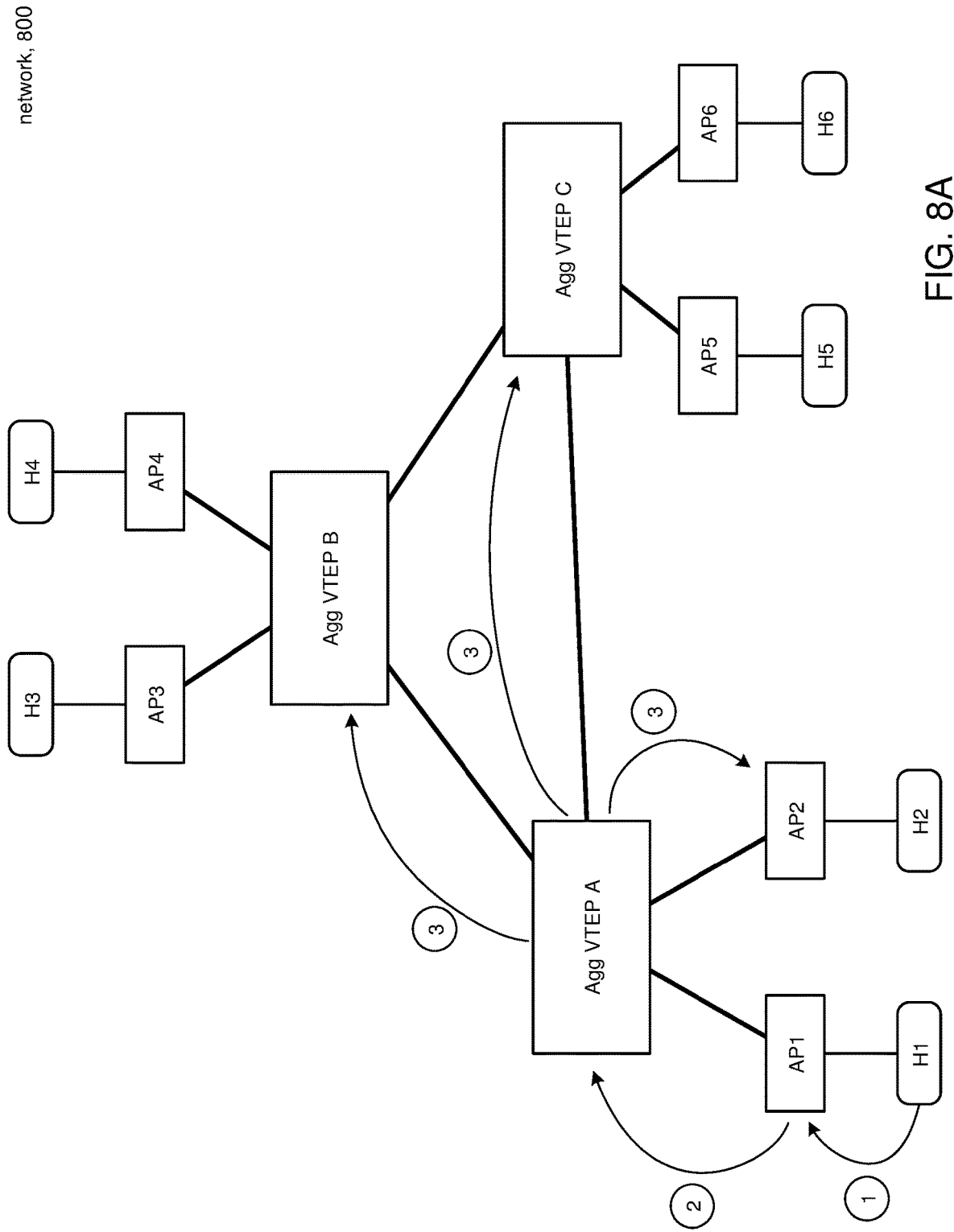
Figure 8B:
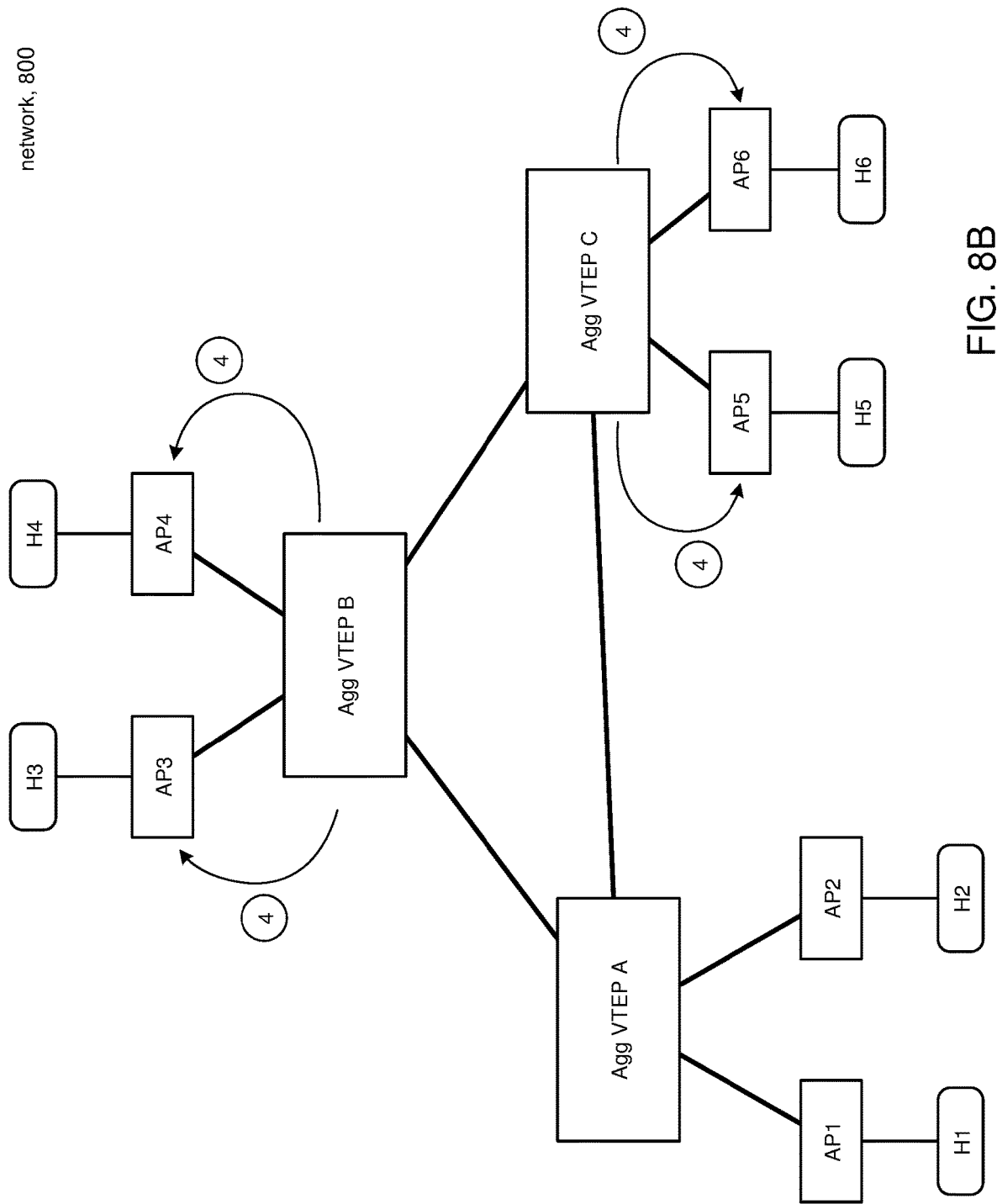

Referring now to FIGS. 8A and 8B, an example is described for processing BUM traffic in network 800. Network 800 is configured in the same way as network 700. The traffic flows shown in FIGS. 8A and 8B are identified by time indices that are represented in the figures as circled numerals. The time indices do not impose or imply any specific timing, coordination, or sequencing of actions, but rather serve only to provide a general idea of the timing and sequencing of actions. It is understood that the actual order in which the actions are performed will depend on particular embodiments of the present disclosure. References to operations in FIGS. 4 and 6 are made when appropriate. References to aggregation VTEPs A, B, and C will be shortened to VTEPs A, B, and C.

Beginning with FIG. 8A, at time index 1 and time index 2, host H1 transmits a BUM packet toward VTEP A, via AP1. For example, the destination MAC address in the packet can be a broadcast MAC address or a multicast MAC address, or host H1 can specify a unicast MAC address that is unknown to VTEP A.

At time index 3, VTEP A receives the VxLAN packet from AP1 (operation 402). VTEP A determines (e.g., operation 406) that it has received a BUM packet and floods the packet according to its flood list (operation 602), which in this example includes AP1, AP2, VTEP B, and VTEP C. The source VTEP is AP1, which is a Type 2 VTEP, and per operation 612 the BUM packet can be flooded to all the neighbors in the flood list of VTEP A, except for AP1 which is the source VTEP.

Referring now to FIG. 8B, at time index 4, VTEP B processes the VxLAN flood packet received from VTEP A (the source VTEP). VTEP B determines (e.g., operation 406) that the VxLAN flood packet encapsulates a BUM packet and floods the packet according to its flood list (operation 602), which includes AP3, AP4, VTEP A, and VTEP C. Because the source VTEP, namely VTEP A, is Type 1, a copy of the BUM packet is sent to all the neighbors in the flood list of VTEP B that are not Type 1 VTEPs in accordance with the present disclosure (operations 606 and 614). Accordingly, VTEP B sends a copy (floods) the BUM packet to AP3 and AP4, but not to VTEP A and VTEP C because VTEPs A and C are Type 1. By not sending a copy of the BUM packet back to VTEP A, we avoid creating a flood loop between VTEP B and VTEP A where the packet can loop between the two VTEPs thus adversely impacting network performance.

VTEP C, likewise, processes the VxLAN flood packet received from VTEP A (the source VTEP). VTEP C processes the received VxLAN packet in the same manner as described above for VTEP B. Briefly, VTEP C determines that the VxLAN flood packet encapsulates a BUM packet and floods the packet according to its flood list, which includes AP5, AP6, VTEP A, and VTEP B. VTEP C floods the BUM packet to AP5 and AP6, but not to VTEP A and VTEP B because VTEPs A and B are Type 1. As with VTEP B, by not sending a copy of the BUM packet back to VTEP A, a flood loop between VTEP C and VTEP A is avoided where the packet can loop between the two VTEPs.

Figure 9:
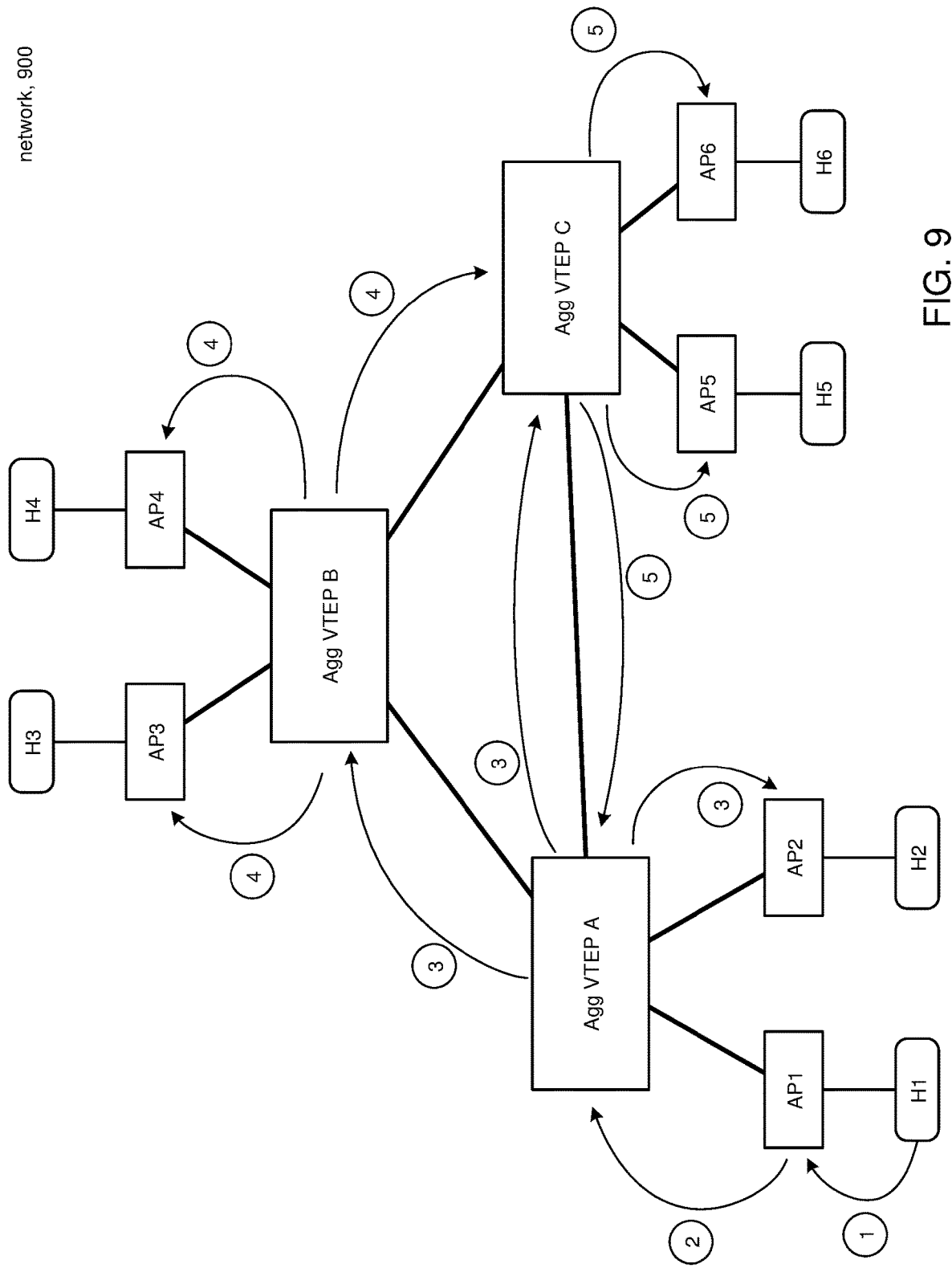
FIG. 9 illustrates a BUM traffic processing using only conventional source pruning.

Referring now to FIG. 9 for comparison purposes, an example is described for processing BUM traffic in network 900 using conventional source pruning, where a flood packet does not get sent back to the sender of the packet. Network 900 is configured in the same way as network 700. The traffic flows shown in FIG. 9 are identified by time indices that are represented in the figures as circled numerals. The time indices provide a general idea of the sequencing of actions. It is understood that the actual order in which the actions are performed will depend on particular embodiments of the present disclosure. References to aggregation VTEP A, aggregation VTEP B, and aggregation VTEP C will be shortened simply to VTEP A, VTEP B, and VTEP C, respectively.

At time index 1 and time index 2, host H1 transmits a BUM packet toward VTEP A, via AP1. At time index 3, A floods the packet to VTEP B and VTEP C. For brevity, we only describe how VTEP B processes the packet received from VTEP A with the understanding that VTEP C processes the packet from VTEP A in a similar manner. At time index 4, in response to receiving the flood packet from VTEP A, VTEP B floods to AP3, AP4, and to VTEP C. Because of source pruning, however, VTEP B does not flood to the source, namely VTEP A, thus preventing a flood loop. Processing of the BUM packet in VTEP B can be deemed complete.

Referring to time index 5, we now describe how VTEP C processes the flood packet received from VTEP B. At time index 5, VTEP C floods to AP5 and AP6, but not to the source (VTEP B) because of source pruning. However, VTEP C floods to VTEP A because source pruning does not remove VTEP A from VTEP C's flood list. Sending the packet from VTEP C to VTEP A will cause VTEP A to once again perform flood processing, giving rise to a flood loop when VTEP A sends a copy of the packet to VTEP B.

Referring back to time index 4, we describe how VTEP B floods in response to receiving the flood packet from VTEP A. Although not shown in FIG. 9, we note that at time index 4 VTEP C also floods in response to receiving the flood packet from VTEP A (at time index 3). Like VTEP B, VTEP C floods only to VTEP B, AP5, and AP6, but not back to VTEP A because of source pruning; source pruning prevents a flood loop from setting up by preventing VTEP C from flooding back to VTEP A. Nevertheless, as explained in above in connection with time index 5, VTEP C still creates a flood loop by virtue of receiving the flood packet from VTEP B at index 4.

However, flood processing in accordance with the present disclosure would prevent VTEP B from sending a copy of the packet to VTEP C at time index 4 because both VTEP B and VTEP C are Type 1 VTEPs. As such, VTEP C avoids creating a flood loop. Recognizing VTEP types in accordance with the present disclosure can avoid flood loops and by so doing improve network performance.

Figure 10:
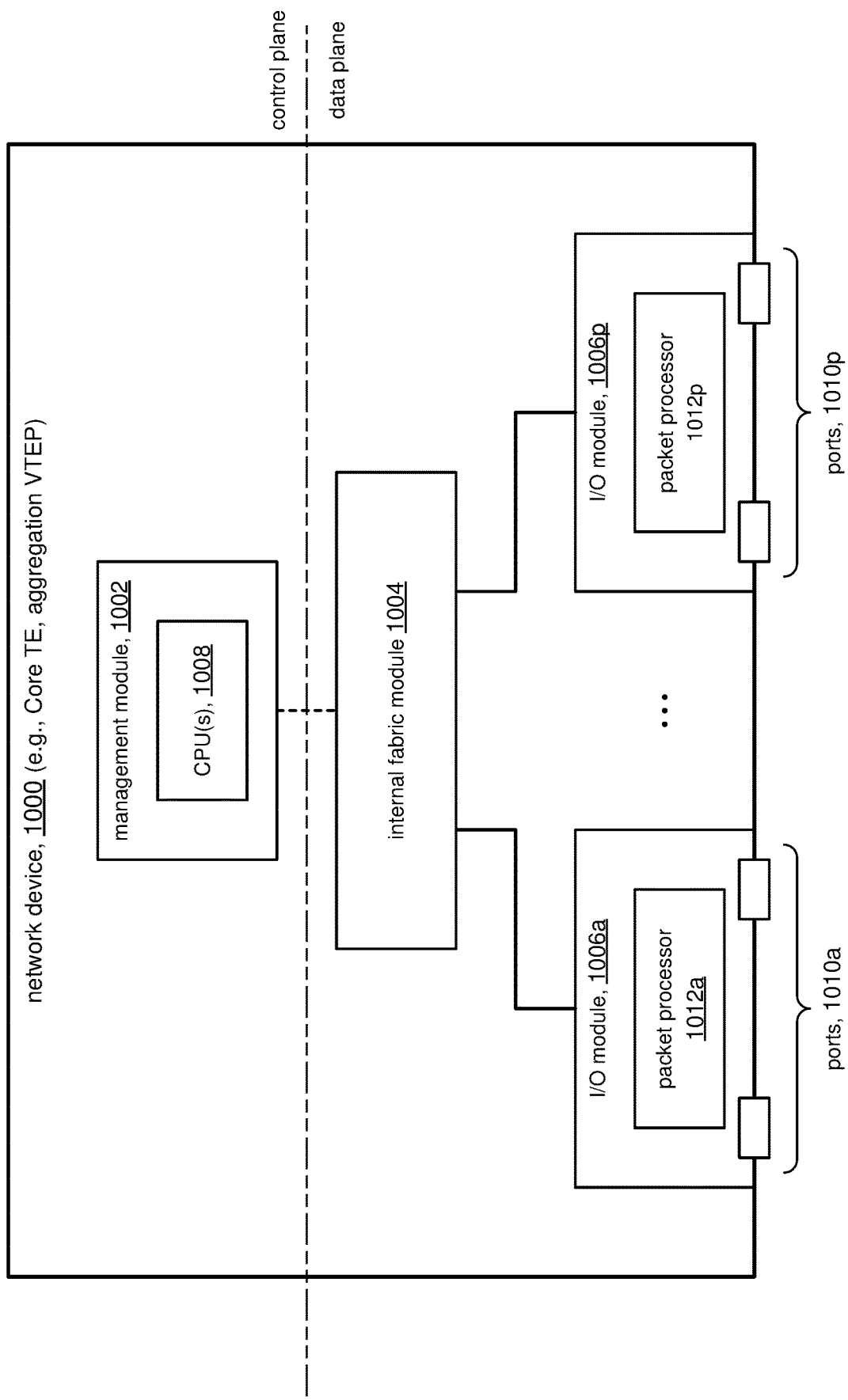
FIG. 10 shows an illustrative switch that can be adapted in accordance with the present disclosure.

FIG. 10 depicts an example of a network device 1000 in accordance with some embodiments of the present disclosure. In some embodiments, network device 1000 can be a core TE (e.g., 102, FIGS. 1A, 1B). As shown, network device 1000 includes a management module 1002, an internal fabric module 1004, and a number of I/O modules 1006a-1006p. Management module 1002 includes the control plane (also referred to as control layer) of network device 1000 and can include one or more management CPUs 1008 for managing and controlling operation of network device 1000 in accordance with the present disclosure. Each management CPU 1008 can be a general purpose processor, such as an Intel®/AMD® x86 or ARM® processor, that operates under the control of software stored in a memory (not shown), such as dynamic random access memory (DRAM). Control plane refers to all the functions and processes that determine which path to use, such as routing protocols, spanning tree, and the like.

Internal fabric module 1004 and I/O modules 1006a-1006p collectively represent the data plane of network device 1000 (also referred to as data layer, forwarding plane, etc.). Internal fabric module 1004 is configured to interconnect the various other modules of network device 1000. Each I/O module 1006a-1006p includes one or more input/output ports 1010a-1010p that are used by network device 1000 to send and receive network packets. Each I/O module 1006a-1006p can also include a packet processor 1012a-1012p. Each packet processor 1012a-1012p can comprise a forwarding hardware component (e.g., application specific integrated circuit (ASIC), field programmable array (FPGA), digital processing unit, content-addressable memory, and the like) configured to make wire speed decisions on how to handle incoming (ingress) and outgoing (egress) network packets. In accordance with some embodiments some aspects of the present disclosure can be performed wholly within the data plane.

Embodiments in accordance with the present disclosure are directed to the prevention of flood loops in a deployment configured with hybrid VTEPs: aggregation VTEPs (Type 1) and simple VTEPs (Type 2). An example of a simple Type 2 VTEP is a wireless access point (AP) configured as a VTEP that sends traffic over a tunnel to a central location (e.g., a wireless LAN controller). Because an AP has limited resources and capability, its VTEP capability is kept "simple" in that it is configured to tunnel traffic only to a specific first hop device. For example, the AP VTEP does not learn remote MAC addresses (MACs on the other end of a VxLAN tunnel) and therefore cannot do lookups on a destination MAC to send traffic to the appropriate remote destination VTEP based on the destination MAC. A Type 1 VTEP, on the other hand, supports all VTEP functions and in addition can provide gateway functionality for several Type 2 VTEPs.

Bridging between Type 1 VTEPs can result in the formation of flood loops and hence degrade performance in the network. To avoid flood loops, ingress packets that specify both a Type 1 source VTEPs and a Type 1 destination VTEPs can be dropped. Ingress packets that specify other combinations of source and destination VTEPs types can be forwarded; e.g., Type 1 source VTEPs/Type 2 destination VTEPs, source and destination are Type 2 VTEPs, and so on. Embodiments in accordance with the present disclosure recognize and distinguish between the two types of VTEPs: Type 1 and Type 2. Each Type 1 VTEP in a deployment classifies the VTEPs it knows about as being Type 1 or Type 2; for example, based on receiving a packet from a VTEP that contains control plane data or data plane data. Each aggregation VTEP installs a rule that matches on a source VTEP that is Type 1 and a destination VTEP that is Type 1 and contains an action to DROP such packets. Each aggregation VTEP also installs rules to match on source/destination VTEPs that are other combinations of Type 1 and Type 2, each with an action to FORWARD such packets.

Further Examples

In accordance with the present disclosure, a method in a network device includes identifying a plurality of virtual extensible local area network (VxLAN) tunnel endpoints (VTEPs) at other ends of virtual tunnels to which the network device is connected; designating the identified plurality of VTEPs as being a first VTEP type (Type 1) or a second VTEP type (Type 2); storing a forwarding rule in the network device, the forwarding rule comprising match criteria to identify an ingress packet that (1) is sent by a Type 1 VTEP and (2) is associated with a next hop destination that is a Type 1 VTEP, the forwarding rule further comprising a DROP action to drop an ingress packet that matches the match criteria; and processing a received ingress packet. The processing includes identifying a next hop destination associated with the received ingress packet; dropping the received ingress packet in response to the received ingress packet matching the forwarding rule when (1) the received ingress packet is sent by a Type 1 VTEP and (2) the identified next hop destination is a Type 1 VTEP, by performing the DROP action of the forwarding rule; and forwarding an egress packet generated from the received ingress packet to the identified next hop destination when either the received ingress packet is sent by a Type 2 VTEP or the identified next hop destination is a Type 2 VTEP.

In some embodiments, a Type 1 VTEP is a network device that is an endpoint to a plurality of virtual tunnels, wherein a Type 2 VTEP is a network device that is an endpoint to a single virtual tunnel.

In some embodiments, designating the identified plurality of VTEPs includes receiving an ingress packet from a first VTEP and designating the first VTEP as a Type 1 VTEP or a Type 2 VTEP based on information contained the received ingress packet. In some embodiments, the first VTEP is designated as Type 1 when the received ingress packet contains control plane data, wherein the first VTEP is designated as Type 2 when the received ingress packet contains data plane data.

In some embodiments, the method further includes re-designating a first VTEP that is currently designated as Type 2 to be designated as Type 1 in response to receiving an ingress packet from the first VTEP that contains control plane data.

In some embodiments, designating the identified plurality of VTEPs includes receiving VTEP designation information from a user.

In some embodiments, designating VTEPs learned by the network device includes the network device receiving VTEP designation information from Type 1 VTEPs and Type 2 VTEPs.

In accordance with the present disclosure, network device includes one or more computer processors and a computer-readable storage medium comprising instructions for controlling the one or more computer processors to: receive an ingress packet over a first virtual tunnel from a sender device, wherein the sender device can be designated as Type 1 or Type 2; decapsulate the ingress packet to recover an inner packet; identify a next hop device using the inner packet, wherein the next hop device can be designated as Type 1 or Type 2; and drop the ingress packet when both the sender device is designated as Type 1 and the next hop device is designated Type 1.

In some embodiments, Type 1 indicates a device that is an endpoint to a plurality of virtual tunnels, wherein Type 2 indicates a device that is an endpoint to a single virtual tunnel.

In some embodiments, the computer-readable storage medium further comprises instructions for controlling the one or more computer processors to generate an egress packet to be forwarded to the next hop device when either the sender device or the next hop device is designated Type 2. In some embodiments, the computer-readable storage medium further comprises instructions for controlling the one or more computer processors to: encapsulate the inner packet in a tunnel packet to generate the egress packet; and forward the egress packet to the next hop device over a second tunnel different from the first tunnel.

In some embodiments, the computer-readable storage medium further comprises instructions for controlling the one or more computer processors to look up a rule among a plurality of forwarding rules, the plurality of forwarding rules including a first rule that represents the following match criteria: the sender device being designated Type 1 AND the next hop device being designated Type 1, wherein the ingress packet is dropped when the first rule is matched. In some embodiments, the inner packet is forwarded when the first rule is not matched.

In some embodiments, the computer-readable storage medium further comprises instructions for controlling the one or more computer processors to receive an ingress packet from a first device and designate the first device as Type 1 or Type 2 based on information contained the received ingress packet from the first device. In some embodiments, the first device is designated as Type 1 when the received ingress packet from the first device contains control plane data, wherein the first device is designated as Type 2 when the received ingress packet from the first device contains data plane data.

In accordance with the present disclosure, a network device includes one or more computer processors and a computer-readable storage medium comprising instructions for controlling the one or more computer processors to: receive an ingress packet over a first virtual tunnel from a sender device, the sender device being designated as Type 1 or Type 2; decapsulate the ingress packet to recover an inner packet; generate a flood list in response to a determination that the inner packet is a broadcast, unicast unknown, or multicast (BUM) packet; and for each neighbor device in the flood list, drop the ingress packet in response to a determination that both the sender device and said each neighbor device are designated Type 1.

In some embodiments, Type 1 indicates a device that is an endpoint to a plurality of virtual tunnels, wherein Type 2 indicates a device that is an endpoint to a single virtual tunnel.

In some embodiments, the computer-readable storage medium further comprises instructions for controlling the one or more computer processors to forward the inner packet to said each neighbor device in response to a determination that the sender device is designated Type 2 or said each neighbor device is designated Type 2. In some embodiments, forwarding the inner packet to the neighbor device comprises: encapsulating the inner packet in an egress packet;

and transmitting the egress packet to the neighbor device over a second tunnel different from the first tunnel.

In some embodiments, the computer-readable storage medium further comprises instructions for controlling the one or more computer processors to look up a rule among a plurality of forwarding rules for each neighbor device in the flood list, the plurality of forwarding rules including a first rule that represents the following match criteria: the sender device being designated Type 1 AND the neighbor device being designated Type 1, wherein the inner packet is forwarded when the first rule is not matched, wherein the ingress packet is dropped when the first rule is matched.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device comprising:
receiving a VxLAN (virtual extended local area network) packet from a source VTEP (virtual tunnel endpoint), wherein the source VTEP is a VTEP of a first type (Type 1 VTEP) or a VTEP of a second type (Type 2 VTEP);
decapsulate the VxLAN packet to recover an inner packet; and
in response to the inner packet being one of a broadcast packet, an unknown unicast packet, or a multicast packet:
identifying neighbors of the network device in a flood list that is dynamically built up and associated with the network device;
determining whether the VxLAN packet is a control plane packet or a data plane packet based on a destination of the inner packet, wherein the source VTEP is a Type 1 VTEP when the VxLAN packet is a control plane packet, wherein the source VTEP is a Type 2 VTEP when the VxLAN packet is a data plane packet;
in response to a determination that the source VTEP is a Type 1 VTEP, forwarding a copy of the inner packet to each neighbor among the identified neighbors in the flood list that are not Type 1 VTEPs; and
in response to a determination that the source VTEP is not a Type 1 VTEP, forwarding a copy of the inner packet to each neighbor in the flood list irrespective of whether they are Type 1 or Type 2 VTEPs.

2. The method of claim 1, wherein a Type 1 VTEP is a network device that is an endpoint to a plurality of virtual tunnels, wherein a Type 2 VTEP is a network device that is an endpoint to a single virtual tunnel.

3. The method of claim 1, further comprising flooding the inner packet to any front panel ports specified in the flood list.

4. The method of claim 1, further comprising:
identifying a plurality of virtual extensible local area network (VxLAN) tunnel endpoints (VTEPs) at other ends of virtual tunnels to which the network device is connected; and
designating the identified plurality of VTEPs as being a Type 1 VTEP or a Type 2 VTEP type.

5. The method of claim 4, wherein designating the identified plurality of VTEPs includes receiving VTEP designation information from a user.

6. The method of claim 1, further comprising, in response to the inner packet being a known unicast packet:
forwarding the inner packet when source device is a Type 1 VTEP and a next hop destination is not a Type 1 VTEP device; and
dropping the inner packet when both the source device and the next hop destination are a Type 1 VTEP device.

7. A network device comprising:
one or more computer processors; and
a computer-readable storage medium comprising instructions for controlling the one or more computer processors to:
receive an ingress packet over a first virtual tunnel from a sender device, wherein the sender device is Type 1 or Type 2;
decapsulate the ingress packet to recover an inner packet; and
in response to the inner packet being one of a broadcast packet, an unknown unicast packet, or a multicast packet:
determine whether the ingress packet is a control plane packet or a data plane packet based on a destination of the inner packet, wherein the sender device is Type 1 when the ingress packet is a control plane packet, wherein the sender device is Type 2 VTEP when the ingress packet is a data plane packet;
forward a copy of the inner packet to neighbors of the network device that are not Type 1 devices when the sender device is Type 1; and
forward a copy of the inner packet to neighbors in the flood list irrespective of whether they are Type 1 or Type 2 devices when the sender device is not Type 1.

8. The network device of claim 7, wherein Type 1 indicates a device that is an endpoint to a plurality of virtual tunnels, wherein Type 2 indicates a device that is an endpoint to a single virtual tunnel.

9. The network device of claim 7, further comprising flooding the inner packet to any front panel ports specified in the flood list.

10. The network device of claim 7, wherein the computer-readable storage medium further comprises instructions for controlling the one or more computer processors to:
determine a next hop device;
forward the inner packet to the next hop device when the sender device is not a Type 1 device; and
drop the inner packet when the sender device and the next hop device are both Type 1.

11. The network device of claim 7, wherein the computer-readable storage medium further comprises instructions for controlling the one or more computer processors to look up a rule among a plurality of forwarding rules, the plurality of forwarding rules including a first rule that represents the following match criteria:
the sender device being designated Type 1 AND
the neighbor device being designated Type 1,
wherein the inner packet is dropped when the first rule is matched.

12. The network device of claim 11, wherein the inner packet is forwarded when the first rule is not matched.

13. The network device of claim 7, wherein the computer-readable storage medium further comprises instructions for controlling the one or more computer processors to receive an ingress packet from a first device and designate the first device as Type 1 or Type 2 based on information contained the received ingress packet from the first device.

14. The network device of claim 13, wherein the first device is designated as Type 1 when the received ingress packet from the first device contains control plane data, wherein the first device is designated as Type 2 when the received ingress packet from the first device contains data plane data.

15. The network device of claim 7, wherein the neighbors of the network device are in a flood list that is dynamically built up by the network device.

16. A network device comprising:
one or more computer processors; and
a computer-readable storage medium comprising instructions for controlling the one or more computer processors to:
receive an ingress packet over a first virtual tunnel from a sender device, the sender device being Type 1 or Type 2;
decapsulate the ingress packet to recover an inner packet;
generate a flood list comprising a plurality of neighbor devices in response to a determination that the inner packet is a broadcast, unicast unknown, or multicast (BUM) packet;
determine whether the ingress packet is a control plane packet or a data plane packet based on a destination of the inner packet, wherein the sender device is Type 1 when the ingress packet is a control plane packet, wherein the sender device is Type 2 VTEP when the ingress packet is a data plane packet;
forward a copy of the inner packet to neighbor devices in the flood list that are not Type 1 devices when the sender device is a Type 1 device; and
forward a copy of the inner packet to neighbor devices in the flood list irrespective of whether they are Type 1 or Type 2 devices when the sender device is a Type 2 device.

17. The network device of claim 16, wherein Type 1 indicates a device that is an endpoint to a plurality of virtual tunnels, wherein Type 2 indicates a device that is an endpoint to a single virtual tunnel.

18. The network device of claim 16, wherein the computer-readable storage medium further comprises instructions for controlling the one or more computer processors to:
determine a next hop device;
forward the inner packet to the next hop device when the sender device is not a Type 1 device; and
drop the inner packet when the sender device and the next hop device are both Type 1.

19. The network device of claim 18, wherein flooding the inner packet to a neighbor device comprises:
encapsulating the inner packet to produce an egress packet; and
transmitting the egress packet to the neighbor device over a second tunnel different from the first tunnel.

20. The network device of claim 16, wherein the computer-readable storage medium further comprises instructions for controlling the one or more computer processors to look up a rule among a plurality of forwarding rules for each neighbor device in the flood list, the plurality of forwarding rules including a first rule that represents the following match criteria:
the sender device being designated Type 1 AND
the neighbor device being designated Type 1,
wherein the inner packet is not flooded to the neighbor devices when the first rule is matched.

* * * * *